United States Patent
Campanella

[11] 3,863,071
[45] Jan. 28, 1975

[54] INFRARED MEASURING SYSTEM WITH CHANNEL SPECTRA NEGATION

[75] Inventor: Angelo J. Campanella, Columbus, Ohio

[73] Assignee: Infra Systems, Inc., Columbus, Ohio

[22] Filed: Apr. 17, 1974

[21] Appl. No.: 461,695

Related U.S. Application Data

[63] Continuation of Ser. No. 261,014, June 8, 1972, abandoned.

[52] U.S. Cl.................. 250/339, 250/351, 250/359
[51] Int. Cl. .............................................. G01t 1/16
[58] Field of Search ............ 250/338, 339, 340, 341, 250/349, 350, 351, 359, 372, 373, 226

[56] References Cited
UNITED STATES PATENTS

| | | | |
|---|---|---|---|
| 3,089,382 | 5/1963 | Hecht et al. .................. 250/226 X |
| 3,405,268 | 10/1968 | Brunton ............................ 250/339 |
| 3,505,524 | 4/1970 | Hjerten ............................. 250/373 |
| 3,631,526 | 12/1972 | Brunton ............................ 250/341 |

Primary Examiner—Archie R. Borchelt
Assistant Examiner—Davis L. Willis
Attorney, Agent, or Firm—William T. Freyer, III; C. Henry Peterson; Tipton D. Jennings, IV

[57] ABSTRACT

Method and apparatus for measuring the constituent properties of a moving web or sheet of thin material utilizing a source of radiation emitting radiant energy in the infrared spectral band, a beam chopper for deriving separate beams of radiation of distinct wavelength bands, and means for directing the beams through the moving sheet. A detector detects the beams transmitted through the web. The first wavelength pass band is known as the absorption band; the other wavelength pass band is the reference band. The detected energy from the absorption and reference pass bands are utilized in a ratio computer whose output is indicative of the measure of the varying constituent. The reference position on the chopper contains material identical to the material, the properties of which are being measured to negate the effect of channel spectra in the measurement of thin films.

6 Claims, 7 Drawing Figures

INFRARED MEASURING SYSTEM WITH CHANNEL SPECTRA NEGATION

This is a continuation, of application Ser. No. 261,014, filed June 8, 1972, now abandoned.

BACKGROUND

In an infrared non-destructive measuring system the absorption spectrum of a substance is the curve of values representing the percentage of light absorbed by the material. These values represent the radiation absorbed at various wavelengths and are a unique characteristic property of a substance. The absorption can be represented as the logarithm of the inverse of the transmission characteristic of the substance, while the spectrogram of the transmission characteristic is often termed the absorption spectrum. Absorption measurements are used in the analysis of unknown mixtures by making direct measurements of the radiation transmission at selected wavelengths at which characteristic absorption by the material occurs.

When several substances each having a unique absorption spectrum occur together in a material, the material spectrum is the summation of the individual absorption spectra of the constituents. In the past, in the analysis of the absorption spectrum of unknown materials containing a plurality of components by infrared spectronanalysis, the usual procedure was the measurement of the percentage absorption at a number of selected wavelengths, at least equal to the number of components in the material, and the solution of a similar number of simultaneous linear equations, in percentage absorption.

Still other prior art systems are specifically directed to measuring a single property. A signal is selected to be absorbed by that property to be measured. This is referred to in the art as the absorption wavelength. However, as well known in the prior art — the selected wavelengths are not completely selective — there is much overlap and many spurious signals arising from other properties in the material and the scattering suffered by the radiation. To overcome this unwanted signal behavior, the "reference" signal is utilized which reacts to the spurious properties alone. This reference signal is then utilized in a mathematical computation, i.e., Lambert-Beer, wheatstone Bridge, ratio computer, etc. to compute a pure measurement of the desired property.

The above-noted arrangements of infrared selective measuring systems, infrared spectrometers and the like are capable of producing absorption vs. wavelength information in most instances with accuracy sufficient to select proper reference wavelengths.

However, in the measurement of thin films of 0.0001 inch and less, the film thickness approaches the wavelength of the reference frequency or a low multiple or submultiple thereof. At such thicknesses, an optical interference phenomena occurs known as "channel spectra" in which transmissivity varies with the wavelength of the reference frequency because of constructive or destructive interference of the reflection from the front and rear surfaces of the film. As a result the energy which is detected at this reference wavelength is unreliable because small changes in film thickness can cause abrupt changes in the level of the detected signal. If used, erroneous measurements of the material property can be obtained. It is mainly energy at the reference wavelength which is affected because the high energy absorption at the absorption wavelength by the property being measured leaves little energy remaining to be affected by this phenomena.

SUMMARY OF THE INVENTION

The present invention is for a selective frequency infrared system for measuring extremely thin film materials. The method encompasses and the apparatus comprises an infrared source and means for deriving signals suitable for use as the absorption wavelength and the reference wavelength. To eliminate the severe spurious effects of optical interference, or "channel spectra" from the practical measurement of very thin films, the reference wavelength is transmitted through material identical to the thin film, the properties of which are to be measured. In this way, that part of the beam of radiation which is most strongly absorbed by the thin film material is removed from the reference signal. The other beam position in the beam separator not having such a material transmits the wavelengths which are absorbed by the material and hence is the absorption wavelength.

OBJECTS OF THE INVENTION

It is a principal object of the present invention to provide a method and means of measuring a material constituent in a thin film without being effected by optical interference such as channel spectra characteristics.

Another object of the invention is to provide an infrared measuring system having the capability of sensing the material property of a very thin film.

Other objects and features of the present invention will become apparent from the following detailed description when taken in conjunction with the drawings in which:

BRIEF DESCRIPTION OF THE DRAWINGS

FIG. 1A illustrates the filter/source/detector arrangement;

FIG. 1B illustrates the multiple filter arrangement;

DETAILED DESCRIPTION OF THE DRAWINGS

Figure 1:
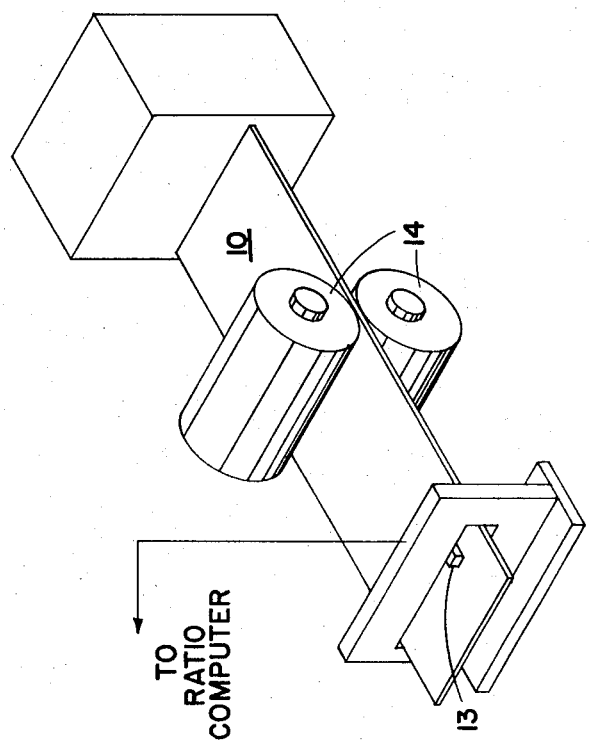
FIG. 1 is a simplified schematic illustration of a preferred arrangement of apparatus of the invention.

With particular reference to the apparatus illustrated in FIG. 1, the material under test measurement is a travelling web 10 of very thin sheet material viz. polypropylene film 0.0002 inches thick. The sheet 10 may be measured at a point adjacent rollers 14.

Light source 13 is a composite frequency source and is operable to emit radiation across the entire infrared spectrum. As known to the art, particular frequencies of the radiation within the spectrum are absorbed by specific properties of the material.

With continued reference to FIG. 1 and particularly to FIG. 1A, adjacent the light source 13 — and intermediate thereof with the sheet 10 — is a plurality of means 27 for effecting a plurality of frequencies within the infrared spectrum. With additional reference to FIG. 1B, and as shown in U.S. Pat. No. 3,405,268.

The radiant energy beam producing means as illustrated includes a radiation source 13, a collimating lens 14, a chopper 11 and a beam splitter 15 which separates the radiant energy beam from collimator 14 into separate beams. The chopper 11, driven by motor M, is provided with opaque blade portions 30' which interrupt the light beam from the radiant energy source 13 at a pre-selected frequency at a point before the light beam is split by the beam spliiter 15. The beam splitter 15 may take various forms, but is illustrated here as comprising a central transmitting window portion 16, and inclined mirror portion 17. The window portion 16 transmits radiant energy directed therein, while mirror portion 17 reflects the intercepted radiant energy beam portions at 45° angles toward mirror not shown which redirect the radiant energy beam portions in a direction normal to the traveling web 10. In this manner separate paths for the pulsed absorption and reference beams are obtained. The radiant energy source may be an incandescent lamp having a continuous spectral output that includes the infrared red band, the lamp being supplied from a well-regulated power supply to provide substantially constant light temperature and hence emission spectrum. An alternative detector location allows thin film measurement by reflection.

As shown in FIG. 1A, in a backscatter gauge, the radiation from source 13 strikes the web/sheet 10 and that which is not absorbed by the paper to detector 19 nor passes through the paper 10 is reflected away from the interface of the paper. The nature and significance of the reflected ray is described in detail in the copending U.S. Pat. application S.N. 874,357, now U.S. Pat. No. and S.N. 822,597, now U.S. Pat. No. 3,597,616.

With the use of prior art measuring systems, such as shown in FIG. 1B, it was noted that spurious offsets occurred during the measurement of thin films. In the investigation of the noted discrepancies, it was found that optical interference was occurring.

A "thin" film (i.e., only several wavelengths thick) will have a transmissivity which varies with wavelength primarily because of constructive or destructive interference of the infrared energy by reflection from its front and rear surfaces. In such case, the reference wavelength transmissivity can shift abrupty if there is a change in film thickness, for example, and thus lead to measurement errors.

Figure 2:
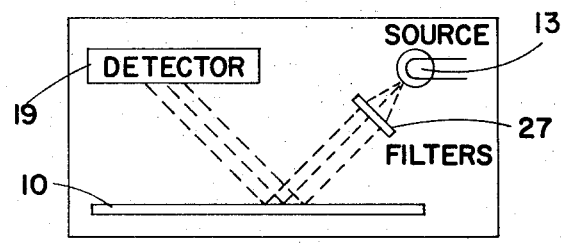
FIG. 2 is a graphical illustration of the absorption and dual reference signals.
Figure 2:
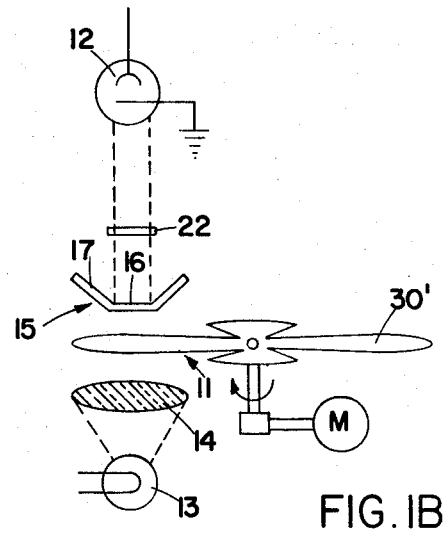
Figure 2:
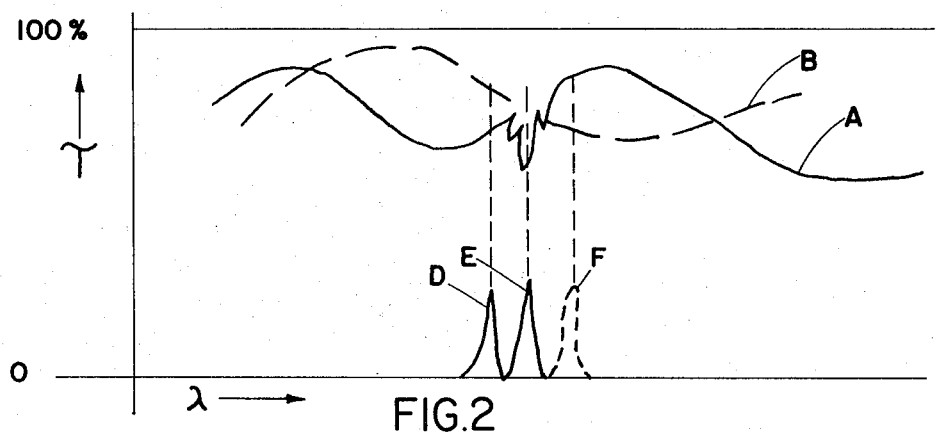

This optical interference is known as the simple ratio technique of an absorption and reference wavelength will not properly cancel the channel spectra effect on the ratio measurement because the absorption wavelength is relatively unaffected measurement. In this instance there is also no pair of distinct non-absorbent wavelengths that will have equal and opposite reflection losses from channel spectra because if the film changes in thickness, the transmissivity at the two selected reference wavelengths will not necessarily be affected in an equal and opposite manner. This is shown in FIG. 2 where the absorption spectrum A shifts to B due to a change in thickness. As can be seen the reference wavelengths D and F undergo marked changes in transmissivity because of the channel spectra affect upon this parameter.

It has been found that the existence of channel spectra relies on the absence of absorption within the film. The effect arises from a wave which is reflected from the second surface, back to the first, then returns to the second surface to pass through and combine with or cancel the directly-transmitted portion of the beam. The vector sum of these waves then has an amplitude whose value varies cyclically as the film thickness increases. Only a small amount of absorption at the reference wavelength will be sufficient to quench the channel spectra effect.

Figure 3:
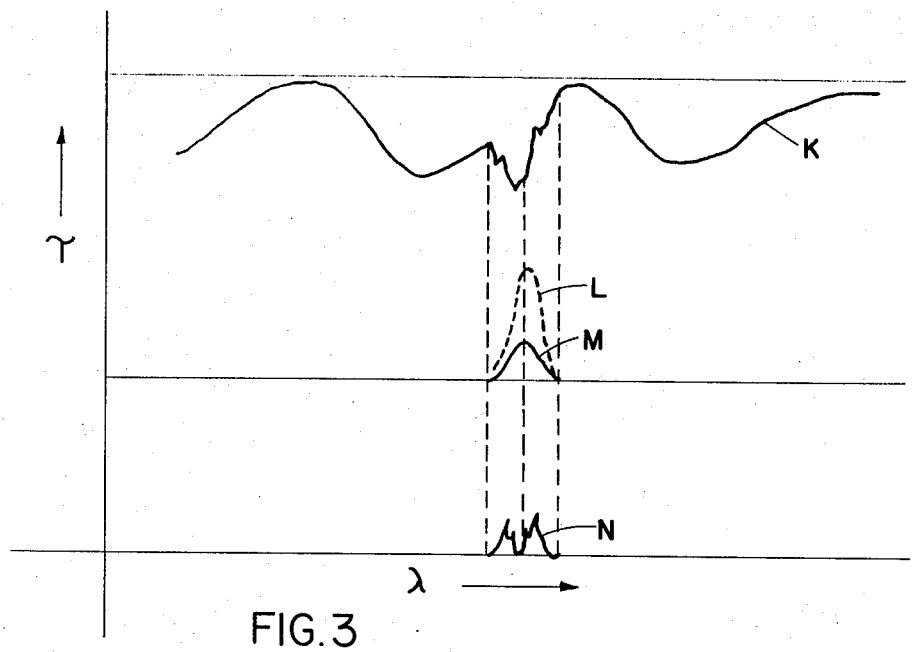
FIG. 3 is a graphical illustration of the filter means to and channel spectra error.

Thus it is desirable to provide one or more reference wavelengths which are partially absorbed. A convenient location for such wavelengths in the infrared spectrum is within the high absorption band and on each slope of the absorption line as shown in FIG. 3. In this manner both the reference and absorption wavelengths are absorbed by the property of the material being measured and the effect of channel spectra is negated.

With reference again to FIG. 1B, a preferred embodiment of the invention will be described with regard to the generation of two reference wavelengths within the absorption band of the absorption wavelength. A single narrow-band filter 22 is used to screen the radiation from a source 13 through or reflected from the film 10 into a detector 12. The single filter eliminates the need for a collimator. This filter is placed at any normal plane in this optical path. The filter's pass band includes only that range of wavelengths where perceptible absorption exists in the film whose thickness is to be measured. All other wavelengths are blocked by the filter 22.

The measurement beam is interrupted in a conventional manner by a chopping wheel 11 which alternately contains clear segments which may contain neutral density attenuators for signal level matching and segments loaded with a film of the same or spectrally similar material to that being measured.

The net effect of this arrangement is that the absorption wavelength contains energy which is highly absorbed by the subject film, being measured as shown at M is FIG. 3 whereas the "reference wavelength contains energy which is absorbed to a lesser extent by the subject film because of the previous high absorption by the film in the chopper. This weak absorptivity is nevertheless sufficient to quench the channel spectra effect anywhere.

In practice, the reference wavelength radiation preferably comprises two narrow bands, shown at N in FIG. 33 one on either side of the strong absorption wavelength line. As explained above, these two reference signals are obtained by passing the infrared energy through the film material in the chopper which severely attenuates the middle portion of the signal leaving two energy bands, immediately adjacent to the absorption band, which are attenuated or absorbed to a lesser extent.

Figure 4:
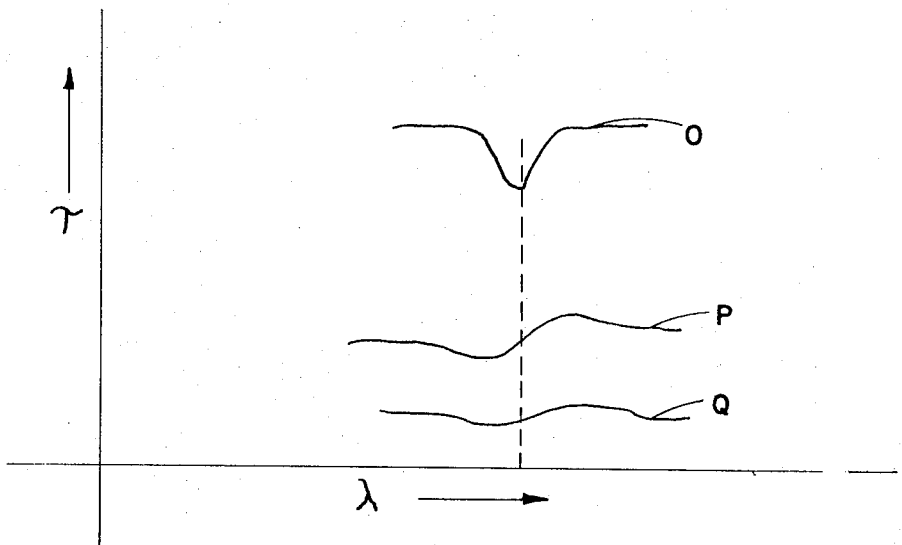
FIG. 4 is a graphical illustration of the effect of anamolous dispersion on reflectivity.

An additional advantage of this symmetrical arrangement is that it allows improvement of the accuracy of film thickness measured. This may be attributed to the film's reflectivity for the absorbance wavelength which is slightly different than that for the reference wavelength. The index of refraction of the film determines the reflectivity which in turn varies about an absorption line according to the principle of anomalous dispersion as shown in FIG. 4. In particular, the index of refraction is slightly lower on the short wave side and slightly higher on the long wave side, of an absorption line. The average of the reflection loss of the references then matches that of the absorption wavelength.

Another advantage of this close spacing of reference and absorption wavelengths is that immunity to channel spectra exists to the greatest thickness. As thickness increases, channel spectra eventually disappears because surface and internal index of refractions variations over a typical measurement area of 1 inches diameter destroys the coherent nature of the beam's reflection. The preferred embodiment produces immunity to channel spectra measurement errors from zero film thickness through the more critical region of about one thousandth of an inch.

In an actual working embodiment of the present invention designed for the measurement of clear polypropylene film varying in thickness from 0.0002 inches to 0.001, inches a two-channel transmission measurement was used. In the system – a single infrared filter — shown in FIG. 5 — was used. The filter is placed under the detector's window. The source wheel reference wavelength position contains a sheet of plastic material having a narrow absorption wavelength line at 3.37 microns; i.e., similar to that of the material (workpiece) being processed. The source wheel absorption position contains an attenuator for electronic pulse balancing.

Figure 5:
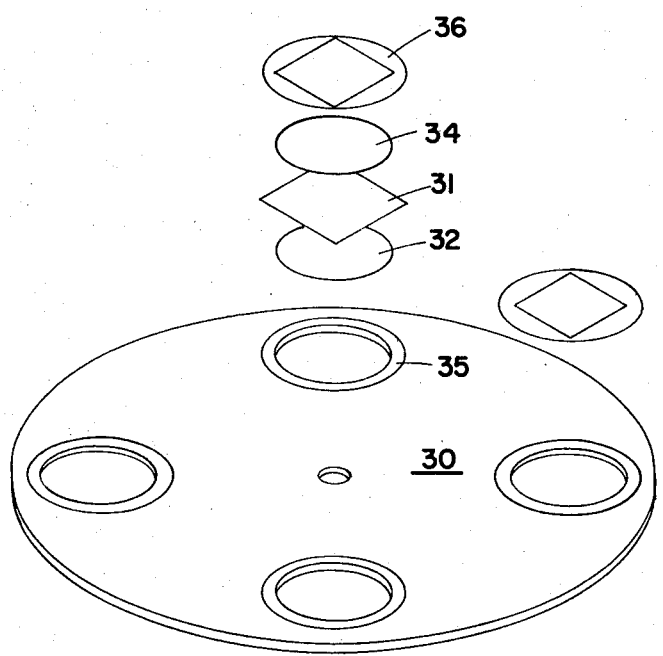
FIG. 5 is a detailed mechanical illustration of the filter wheel of the present invention.

With specific reference to FIG. 5 the plastic reference wheel assembly 30 is shown. The wheel contains four positions and is a chopping wheel which interrupts the infrared beam in a conventional manner. Chopping wheel 30 alternately contains apertures, such as shown at 35, loaded with a film 31 of the same or spectrally similar material to that being measured, and clear apertures which may contain neutral density attenuators for signal level matching. Numerals 32 and 34 identify glass covers for holding the film, and a retainer 36 retains the assembly in aperture 35.

What is claimed is:

1. In an infrared system for measuring the constitutent properties of a thin film material subject to the effect of channel spectra, wherein at least two beams of infrared energy are radiated, passed through or reflected from the material, and then detected, one of said beams being the reference signal and one being the absorption signal, the improvement being in the portion of the system for deriving the separate beams of energy and comprising:
   a. filter means positioned to limit the passband of all beams to a band where perceptible absorption exists in the film material to be measured, and
   b. a material sample, positioned in said system to attenuate only the beam corresponding to the reference signal by the passage of said beam through said material sample and absorption thereby, wherein said sample is:
      1. made of the same material or a material spectrally similar to that to be measured, and
      2. said sample is separate from the film material to be measured.

2. In a system as claimed in claim 1 having a source of radiation in the infrared spectral band, and further comprising:
   a. a chopper positioned to intercept the radiation from said source, and having:
      1. at least two apertures formed therein for the sequential passage of infrared energy therethrough during movement of said chopper,
      2. said material sample being positioned in at least one of said apertures to form the reference signal beam as such aperture moves into optical alignment with said source during movement of said chopper.

3. In a system as claimed in claim 2 having a motor for rotating said chpper and wherein:
   a. said chopper has four apertures formed therein for the sequential passage of infrared energy therethrough.
   b. said material sample is positioned in two non-adjacent apertures, and
   c. said two remaining apertures passing absorption signal beams as such apertures move into optical alignment with said source during rotation of said chopper.

4. In a system as claimed in claim 2 wherein:
   a. said filter means is positioned between said chopper and the material to be measured, and is in optical alignment with said source of radiation.

5. In a system as claimed in claim 4, wherein:
   a. said material to be measured is a film having a thickness no greater than approximately 0.001 inch.

6. In a system as claimed in claim 4 wherein:
   a. said reference signal beam after passage through said filter means and material sample has a wavelength above and a wavelength below the wavelength of said absorption signal beam.

* * * * *